United States Patent Office 3,025,267
Patented Mar. 13, 1962

3,025,267
HYDROXYALKYLVINYL ETHER-ETHYLENE COPOLYMER
John D. Calfee, Dayton, Ohio, assignor to Monsanto Chemical Company, St. Louis, Mo., a corporation of Delaware
No Drawing. Filed Aug. 18, 1958, Ser. No. 755,425
17 Claims. (Cl. 260—77.5)

The present invention is directed to interpolymers of β-hydroxyethylvinyl ether and ethylene, and to a method of preparing same by the interpolymerization of β-hydroxyethylvinyl ether and ethylene.

It is further directed to curing β-hydroxyethylvinyl ether-ethylene copolymers by treating same with polyisocyanates, and to the resulting high melting point ethylenic polymers. The term "melting point" is employed in the specification or claims herein in its common meaning as the temperature at which a solid is converted to either a viscous or free-flowing liquid, which could probably be more accurately termed a "softening temperature" in more precise, scientific terminology.

The β-hydroxyethylvinyl ether-ethylene interpolymers of the present invention are prepared under conditions ordinarily employed in the high pressure polymerization of ethylene.

In one particular aspect the present invention concerns admixing an organic polyisocyanate with the β-hydroxyethylvinyl ether-ethylene copolymer in the presence of inert solvent, and to solutions of the stated copolymer and polyisocyanate as a stable form of the materials for forming into shaped structures and cured polymeric material. In another specific aspect the invention concerns particles of the aforesaid copolymer coated with organic polyisocyanate, or admixed with discrete particles thereof, and the use of such particulate forms of the copolymer and polyisocyanate in molding, extrusion and coating procedures.

It has previously been found that hydroxyl-containing vinyl compounds do not readily copolymerize with ethylene, apparently because they function to some extent as chain transfer agents, thereby inhibiting the copolymerization, or causing the production of low molecular weight liquid materials.

It has now been discovered, however, that ethylene and β-hydroxyethylvinyl ether are capable of copolymerizing to produce high molecular weight solid polymers.

It is an object of the present invention to provide a polymer with hydroxyl containing groups substituted on a hydrocarbon backbone. It is a further object to provide a straight-forward procedure for producing such polymers. The presence of hydroxyl groups in such a polymer will improve various properties of the polymer such as moisture vapor transmission properties, ink receptivity, and will also provide reactive groups for curing, cross-linking, or for the addition of various groups to modify the properties of the polymer in various ways as may be desired. It is believed that the hydroxyl-containing polymers of the present invention can be accurately described as having the branched structure characteristic of high pressure polyethylene substituted at intervals by β-hydroxyalkoxy groups, as represented by the formula below.

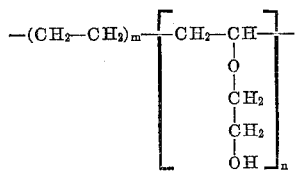

wherein m and n represents integers, the sum of which ethylene. The interpolymerization of the present invenis dependent upon the number of monomer units in the high molecular weight, solid copolymer. The integer n will not ordinarily be greater than the integer m, and in order to retain the valuable properties of polyethylene, with the additional advantage of the hydroxyethoxy substituents, the integer n will ordinarily have a ratio to m in the range of 1:50 to 1:6. It will be realized that the above structure represents an average of the units in the molecule, and that some units can have more side chains and some can have fewer side chains for a specified length of the main molecular chain. It will also be understood that the hydrocarbon chain can itself be branched to a certain degree, and the main chain of the molecule can contain a very small percentage of ether groups. The polymers of the present invention are ordinarily insoluble in water.

Thus, the present invention provides a polymer having primary hydroxyl groups separated by ethoxy groups from the hydrocarbon backbone of the polymer.

While the present invention is especially directed to polymers as represented having β-hydroxyethoxyl groups, it will be understood that polymers having other β-hydroxyalkoxyl groups of 2 to 6 or 20 carbon atoms, particularly of 2 to 4 carbon atoms, are contemplated as within the invention, and can be prepared by copolymerization under the conditions described herein of ethylene with hydroxyalkyl vinyl ethers in which the alkyl group has 2 to 6 or 20, and particularly 2 to 4 carbon atoms, as represented by:

in which n is in the range of 0 to 4, particularly 0 to 2; for example, copolymerization of ethylene with hydroxypropyl vinyl ether or hydroxybutyl vinyl ether. While the described polymers containing hydroxyalkoxyl groups other than β-hydroxyethoxyl are suitable for the uses described herein, including reaction with isocyanates, it is to be understood neither they nor any other hydroxyalkoxyl groups are by any means considered equivalent that to the β-hydroxyethoxyl containing polymers with respect to such uses and the ease of preparation in high molecular weight species.

The discussion and illustrations below are directed to interpolymerization of β-hydroxyethylvinyl ether and ethylene, and to the resulting polymers; however, the invention contemplates the substitution of the other indicated β-hydroxyalkyl vinyl ethers and the resulting polymers.

A hydroxyl containing polymer which has previously found extensive use is polyvinyl alcohol, which has secondary hydroxyl groups directly attached to a hydrocarbon backbone. In the usual preparation of polyvinyl alcohol, however, it is necessary to first polymerize vinyl acetate and then to remove acetate groups by hydrolysis. In the present invention, no such hydrolysis is necessary. Moreover, the secondary hydroxyl groups in polyvinyl alcohol will not react as readily with isocyanates as will the primary hydroxyls in the present polymers; in addition, ester and similar derivatives formed from primary hydroxyls are more stable than such derivatives, formed from secondary hydroxyls.

It is a further object of the invention to prepare a cured polymeric material comprised in major proportion of ethylene copolymerizate, and preferably comprised very largely of such copolymerizate, and being substantially non-melting, even at temperatures as high as 200 to 250° C. or the like.

The process of the present invention is carried out under conditions which cause the polymerization of ethylenically unsaturated monomers to high molecular weight solid materials, particularly under the conditions which are employed in the high pressure polymerization of tion can be carried out at ethylene pressures from about 5000 p.s.i. gauge to 50,000 p.s.i. gauge at temperatures of about 50° C. to 250° C., but is preferably carried out at pressures from about 15,000 p.s.i. to 50,000 p.s.i. and at temperatures from 100° C. to 200° C. It is, of course, possible to employ higher pressures up to 200,000 p.s.i. or even up to 1,000,000 p.s.i. or more, but such extremely high pressures are not required. It is also possible to employ lower pressures down to 500 p.s.i. or so or even down to atmospheric pressure, provided that suitably active catalysts are employed along with high temperature, but the use of such low pressures ordinarily requires extremely long reaction times and results in production of lower molecular weight materials than are obtained at higher pressures. Similarly, it is possible to employ higher temperatures so long as they do not cause pyrolysis or unduly rapid reaction under the reaction conditions, and it is also possible to employ lower temperatures, even down to room temperature or the like, although the reaction will not be very rapid at low temperatures. Moreover, when catalysts which dissociate in the polymerization reaction are employed, it is preferred to employ temperatures high enough to cause such dissociation.

It is known that ethylene will polymerize at elevated temperature and pressure in the absence of catalysts, particularly if the ethylene happens to contain trace small amounts of oxygen which have a catalytic effect. However, in the present invention, it is preferred to employ free radical initiating catalysts to insure the preparation of high molecular weight materials in reasonable reaction times. In general, ethylene polymerization catalysts, including oxygen are suitable. On a weight basis, about 10 to 200 parts per million of oxygen is very suitable at 20,000 to 40,000 p.s.i. ethylene. Among the preferred catalysts are the peroxide catalysts and the azo catalysts. Among the peroxide type catalysts are for example ditolyl peroxide, benzoyl peroxide, diacetone peroxide, succinyl peroxide, acetyl peroxide, acetylbenzoyl peroxide, meta-bromobenzoyl peroxide, lauroyl peroxide, 2,2-bis-t-butyl-peroxybutane hydrogen peroxide, zinc peroxide, peracetic acid, alkali metal persulfates, perborates and percarbonates, ammonium persulfate, perborate and percarbonate and in general all those peroxide compounds which are either formed by the action of hydrogen peroxide on ordinary acids or else which give rise to hydrogen peroxide on treatment with dilute sulfuric acid. These materials are peroxy compounds as defined in Webster's International Dictionary (1935) 2nd edition [page 3 of Patent 2,396,920 and column 3 of Patent 2,748,170]. As examples of suitable azo catalysts may be mentioned bis-benzene diazosuccinate, the inorganic acid salts of 2,2'-di-guanyl-2,2'-azopropane, 2,2'-azobis(methylisobutyrate) or 2,2'-azo-bis(isobutyramide). The catalyst will ordinarily be employed in as small quantity as will produce the desired polymer in a reasonable reaction time. Moreover, the amount of catalyst has some effect on molecular weight as larger amounts of catalysts ordinarily cause the production of lower molecular weight materials. However, the amounts of catalysts employed will ordinarily be within the range of 0.0005 percent to 2 percent, based on the monomers. The interpolymers produced in the present invention are solid materials preferably having molecular weights of at least 10,000 and ordinarily having molecular weights ranging from 20,000 to 50,000 or 100,000, and can even have molecular weights as high as 1,000,000 or more. The molecular weights referred to are those calculated in the conventional manner on the basis of the viscosity of the polymer in solution as described in the Journal fur Praktischemie, 2nd series, volume 158, page 136 (1941) and Journal of the American Chemical Society, 73, page 1901 (1951). The following examples are set forth as illustrative of certain embodiments of the present invention.

*Example 1*

A bomb capable of withstanding high pressure was mounted in a shaker and provided with means for maintaining ethylene at constant pressure therein. The bomb having a capacity of 250 cc. was charged with 30 g. of hydroxyethylvinyl ether and 0.005 cc. of ditertiarybutyl peroxide, and pressured to 25,000 p.s.i. gauge with ethylene. The bomb was then heated at a jacket temperature of 135° C. and an internal temperature of 125° C. for 12 hours. Upon opening the bomb, 45 g. of solid polymer having a density of 0.9362 was obtained. With the amount of ethylene supplied to the reaction estimated as being 120 g., the estimated conversion is 45 g. The water-insoluble polymer had a specific viscosity of 0.069 (0.1% solution of the polymer in xylene at 100° C.), a tensile strength of 1550 p.s.i. to yield and 1639 p.s.i. at break, and a percentage of elongation of 16 at yield and 453 at break. Analysis of the polymer for carbon (82.23%) and hydrogen (13.66%) demonstrated the presence of oxygen (3.01%) in the polymer (by difference). Infrared analysis indicated that the ethylene-hydroxy ethyl vinyl ether copolymer had a hydroxyethoxy polyethylene structure by the presence of an ether band 1105 cm.$^{-1}$ and hydroxyl bands at 3500 cm.$^{-1}$ and 1055 cm.$^{-1}$. Complete curing of the polymer by reaction with diisocyanates as described in examples below further confirms the presence of the structure containing free hydroxyl groups.

*Example 2*

A polymerization was carried out under substantially the conditions of Example 1, but employing internal temperatures of approximately 128 to 190° C. and with about 130 g. of ethylene and 7 grams of β-hydroxyethylvinyl ether being provided for the reaction. A 55 g. amount of the hydroxyethylvinylether ethylene copolymer was obtained for about 39% yield. The copolymer had density of 0.9231 and specific viscosity of 0.163. The tensile strength was 1755 p.s.i. to yield and 2235 p.s.i. at break, and the elongation was 20 at yield and 343 at break.

*Example 3*

In a polymerization carried out under the conditions of Example 1 for 16 hours, a 60 g. amount of the hydroxyethylvinyl ether ethylene copolymer was obtained for about a 40% yield.

*Example 4*

The interpolymerization of about 100 g. ethylene at a constant pressure of 25,000 p.s.i. gauge, and hydroxyethylvinyl ether, 25 g., was carried out in the presence of 20 grams propane and 0.005 cc. ditertiarybutyl peroxide at elevated temperature for 12 hours to produce 42 g. of the desired copolymer.

*Example 5*

An estimated 90 g. of ethylene at 25,000 p.s.i. were provided for reaction with 25 g. of β-hydroxyethylvinyl ether in the presence of 0.003 cc. of ditertiarybutyl peroxide and 20 g. of propane in a bomb at an internal pressure of 150° C. for 2½ hours. The copolymerization produced 42 g. of ethylene 2-hydroxyethylvinyl ether copolymer for about a 36% conversion.

*Example 6*

A sample of the copolymer of Example 1 was dissolved by heating in xylene and about 10% by weight based on the copolymer of 4,4'-methylene diphenyl isocyanate (4,4'-diisocyanato-diphenylmethane) was added to the hot solution. The solution was then heated at 140° C. until the xylene was driven off, and a rubbery polymer was obtained which was transparent and insoluble even in boiling xylene. It is thus demonstrated that the copolymer had free hydroxyl groups which could be cross-linked by diisocyanates.

Example 7

A 3.5 gram amount of the copolymers of Example 1 was dissolved in 25 cc. xylene and 0.1 gram 4,4'-methylene diphenyl isocyanate dissolved in 10 cc. xylene was added. The mixture was poured into a flat aluminum foil dish and the xylene was evaporated over a steam bath for 1 hour. The polymer was insoluble in boiling xylene and had excellent adhesive properties; the aluminum foil could not be removed by pulling.

Example 8

In a procedure similar to that of Example 7, copolymer of Example 2 heated with about 2% by weight of 4,4'-methylene diphenyl isocyanate at 100° C. for 20 minutes was insoluble in boiling xylene.

Example 9

To a 16 gram amount of the copolymer of Example 2 on a hot mill, a 0.07 gram amount of 4,4'-methylene diphenyl isocyanate dispersed in 10 cc. benzene was added and the material was mixed by passing through the mill rolls several times. The material was then molded at 180° C.

Example 10

A 5 gram amount of the copolymer of Example 1 was dissolved in 20 cc. toluene and 0.05 gram 4,4'-methyl diphenyl isocyanate dissolved in 5 cc. toluene was added. No gelation occurred even after heating at the boiling point of toluene for 15 minutes. However, evaporation of the solution to dryness gave a thin film of highly cross-linked polymer. Upon being heated for a prolonged time and then cooled, the solution gelled, showing that cross-linking had occurred. The non-gelling nature (for short periods of time) of the solutions at temperatures such as those up to about 110° C. demonstrates that the β-hydroxyethylvinyl etherethylene copolymer and diisocyanate can be processed in solution before gelation occurs, thereby providing a method of adding diisocyanate to the polymer and casting film for subsequent curing, slush molding to be followed by curing, or solution spinning of fibers to be followed by curing.

Example 11

A gram of the copolymer of Example 1 was dissolved in hot toluene, precipitated by addition of hexane, filtered from the liquid and while still moist mixed with 0.03 gram of 4,4'-methylene diphenyl isocyanate dissolved in 3 cc. toluene. The finely divided polymer coated with the diisocyanate curing agent was then air-dried, and was then simultaneously molded and cured by heating in a mold at about 100° C. A similar result is obtained when the finely divided polymer is dusted with solid particles of 4,4'-methylene diphenyl isocyanate. It is thus demonstrated that it is possible to have stable molding powder of β-hydroxyethylvinyl ether-ethylene copolymer and organic diisocyanate which cures upon heating, thereby making it possible to mold, extrude, or otherwise form the material into articles without premature curing. If the molding material were prepared by adding the diisocyanate to a hot melt of the copolymer, reaction would occur and extensive curing would take place before the material could be molded or extruded. When a metal wire heated to about 100 to 150° C. is dipped or rolled in particulate β-hydroxyethylvinyl ether-ethylene copolymer, and 4,4'-methylene diphenyl isocyanate it becomes coated with a tightly adherent coat of the copolymer cross-linked by reaction with the diisocyanate. This provides an insulating coating for the wire which is heat stable and non-melting up to temperatures of the order of 200 to 250° C., which, of course, is much higher than the melting point of ordinary polyethylene. The coating can also be applied by adding the copolymer and diisocyanate to conventional wire-coating extrusion apparatus and heating and extruding the coated wire therefrom according to conventional procedure.

Example 12

A sample of β-hydroxyethylvinyl ether-ethylene copolymer was converted to a finely divided state by precipitation from hot solvent. A 1.65 gram amount of the finely-divided material was mixed with a spatula and shaken with 0.08 gram of 4,4'-methylene diphenyl diisocyanate which had been ground to a fine powder. The mixture was slightly moistened with xylene and pressed between smooth aluminum sheets at 185° C. for 5 minutes. The aluminum sheets were so firmly attached that it was necessary to dissolve them in caustic to remove them. This material furnishes a convenient adhesive for bonding aluminum sheets or in fact any other metal. The plastic sheet obtained by dissolution of the aluminum sheets was insoluble in hot toluene and closely resembled conventional polyethylene film in appearance. The sheet was essentially free of blemishes from undissolved diisocyanate compound.

The ethylene interpolymers of the present invention can be employed in the applications for which ethylene polymers are ordinarily employed, that is in molding uses, as coatings, films, and the like, and will have the valuable properties of polyethylene, and in addition will have certain valuable properties due to the presence of the hydroxyethoxyl groups on the polyethylene backbone. The hydroxyl groups will be particularly valuable in improving the moisture vapor transmission properties and the ink receptivity for printing in such applications as packaging and other film uses. Moreover, the presence of the reactive groups on the polyethylene structure makes it possible to cross-link the polymers, thereby producing materials as disclosed and claimed herein having greater high temperature resistance, that is, higher softening and melting points, which is particularly valuable in electrical applications.

The present invention provides a method of obtaining a controlled amount of hydroxyl-containing groups in an otherwise essentially hydrocarbon polymer. This is a great improvement over other methods such as attempting to control the proportions of free hydroxyl groups in polymers such as polyvinylacetates by partial hydrolysis thereof. Moreover, the hydroxyl groups in the present polymers are primary hydroxyls.

The ratio of monomers provided for the preparation of the copolymers of the present invention can vary considerably; so long as both monomers are present in substantial amounts, the copolymers are considered within the present invention. However, as the object of the present invention is to modify the polyethylene structure by incorporating hydroxyethoxy groups, the amount of ethylene polymerized into the polymer will not ordinarily be less than 50 molar percent; thus the molar parts of β-hydroxyethylvinyl ether in 100 parts of the copolymer can vary from about 1 part to 50 parts. However, it is generally preferred to employ about 2 to 10 or 15 molar parts of hydroxyethylvinyl ether for 100 molar parts of ethylene.

As the organic isocyanate cross-linking agents employed in the present invention, any organic polyisocyanates capable of reacting with groups containing active hydrogen to form addition products can be employed. Generally, the cross-linking agents will be hydrocarbon diisocyanates, such as those represented by the formula $$R(NCO)_2$$

where R represents a divalent aliphatic or alicyclic hydrocarbon group of 2 to 18 carbon atoms, or divalent hydrocarbon residues of benzene, naphthalene, diphenyl, diphenyl alkanes, or triphenyl alkanes. Typical of the polyisocyanates which can be employed are trimethylene diisocyanate, tetramethylene diisocyanate, pentamethylene diisocyanates, hexamethylene diisocyanate, decamethylene diisocyanate, 2-decyl - 1,3 - diisocyanatopropane, p-phenylenediisocyanate, 4,4′-methylene diphenyl isocyanate, toluene 2,4-diisocyanate, 2,4-diisocyanato-1-chlorobenzene, 1,2,4-benzene triisocyanate, 1,4-cyclohexylene diisocyanate. It will be realized that homologues of the foregoing can be employed, and it will also be possible to employ analogs, such as the corresponding thioisocyanates. The part of the molecule intermediate to the isocyanate groups can contain other groups such as halogen, ether, thioether, tertiary amino, sulfone, etc., groups which do not contain active hydrogen atoms. The organic polyisocyanates can be employed in the form of their precursors, e.g., phenyl urethanes, or generated in situ in the curing reaction, as by eliminating hydrogen chloride from the corresponding carbamic chloride compounds. The reaction with organic isocyanates will generally produce urethane groups, and the resulting products can be considered polyurethanes.

The amount of organic isocyanate employed in the curing reaction can be varied to some extent, dependent upon the amount of cross-linking desired, but amounts in the range of about 1 to 4 are 5% by weight based on the hydroxyethylvinyl ether-ethylene copolymer are usually suitable. Larger amounts, such as up to 40 or 50% by weight can be employed. It will often be desirable to use approximately the amount of organic polyisocyanate stoichiometrically required to react with all the free hydroxyl groups in the interpolymer, although greater or lesser amounts can be employed; if greater amounts are used, the resulting product will have free isocyanate groups which can be further reacted with various groups, such as carboxyl, amino, hydroxyl, etc., groups of various other monomeric or polymeric materials.

When it is desired to conduct the curing reaction in the presence of an inert solvent as described herein, any inert, preferably hydrocarbon or chlorinated hydrocarbon, solvent having substantial solvating properties for $\beta$-hydroxyethylvinyl ether-ethylene polymer and organic isocyanate can be employed. Relatively non-volatile aromatic solvents, such as toluene, xylenes, etc. are ordinarily employed.

If desired, catalysts, such as tertiary amine catalysts, can be employed to accelerate the curing reaction. Moreover, small amounts of water or water-containing materials can be added to or included in the curing polymer mixture in order to produce foamed products.

It will be advantageous to stabilize the polymers of the present invention, in either cured or uncured forms, against attack of the ether linkages therein by acid, and against oxidation and other possible causes of degradation. Acid scavengers and anti-oxidant stabilizers are suitable for this purpose, particularly those stabilizers known as polyvinyl chloride stabilizers, such as organotin compounds, organo-lead compounds, alkaline earth metal salts of long chain fatty acids, and epoxy compounds, e.g., stannous stearate, lead stearate, dibutyl tin dilaurate, epoxy resins, glycidyl ethers of polyalkyleneglycols, such as 2,3-epoxybutyl ether of diethylene glycol, etc. The polymers of the present invention can also be stabilized by antioxidants which are antioxidants for natural or synthetic rubber; the antioxidants can be employed individually, or admixed with each other or with one or more polyvinyl chloride stabilizers. The phenolic type and amine type antioxidants are the preferred types for use herein, e.g., sulfides of dialkyl phenols, particularly sulfides of alkyl cresols, such as 4,4′-thiobis-(6-tert-butyl-m-cresol), "Age Rite White" (symmetrical di-beta-naphthyl-p-phenylenediamine), etc. The stabilizers can be incorporated in the polymers in conventional manner in amounts from 0.005 weight percent for the most effective stabilizers to 5.0 weight percent for the least effective stabilizers.

The polymers of the present invention can also be blended with plasticizers, such as polyester type plasticizers, fillers, such as cellulose, starches, carbon blacks, silicates, clays, etc., and with other resin-compounding ingredients.

What is claimed is:

1. A normally-solid copolymer of ethylene and an hydroxyalkylvinyl ether in which the alkyl group has 2 to 6 carbon atoms.

2. The copolymer of claim 1 which contains at least 50 molar parts ethylene per 100 parts copolymer.

3. A normally-solid copolymer of ethylene and $\beta$-hydroxyethylvinyl ether characterized by a hydrocarbon chain substituted at intervals by $\beta$-hydroxyethoxyl groups.

4. The method of preparing a high molecular weight interploymer which comprises copolymerizing ethylene and an hydroxyalkylvinyl ether in which the alkyl group has 2 to 6 carbon atoms at elevated temperatures and high pressures in the presence of a free-radical initiating ethylene polymerization catalyst.

5. The method of preparing a copolymer of $\beta$-hydroxyethylvinyl ether and ethylene which comprises copolymerizing $\beta$-hydroxyethylvinyl ether and ethylene at elevated temperatures and high pressures in the presence of a free-radical initiating ethylene polymerization catalyst.

6. The method of claim 5 in which a peroxide catalyst is employed.

7. The method of claim 5 in which an azo catalyst is employed.

8. The method of preparing a high melting point ethylenic polymer which comprises copolymerizing an hydroxyalkylvinyl ether in which the alkyl group has 2 to 6 carbon atoms and ethylene at elevated temperature and high pressure and treating the resulting copolymer with a small amount of organic polyisocyanate.

9. A high temperature resistant $\beta$-hydroxyethylvinyl ether-ethylene copolymer with $\beta$-hydroxyl groups converted to urethane groups by reaction with organic diisocyanates.

10. The method of curing $\beta$-hydroxyethylvinyl ether-ethylene copolymer which comprises heating same with an organic polyisocyanate.

11. The method of preparing materials of hydroxyethylvinyl ether-ethylene-hydrocarbon diisocyanate interpolymer which comprises dissolving hydroxyethylvinyl ether-ethylene copolymer and a hydrocarbon diisocyanate in an inert solvent by heating to effect dissolution and then removing the solvent by further heating.

12. A normally solid copolymer of ethylene and $\beta$-hydroxyethylvinyl ether characterized by a hydrocarbon chain substituted at intervals by $\beta$-hydroxyethoxyl groups, the polymer conforming substantially to the structure:

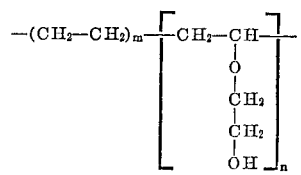

in which $n$ and $m$ are integers and the average ratio of $n$ to $m$ is in the range of 1:50 to 1:6.

13. A composition stable at temperatures up to 110° C. comprising $\beta$-hydroxyethylvinyl ether-ethylene copolymer and a hydrocarbon diisocyanate in an inert solvent.

14. A composition comprising a solution of $\beta$-hydroxyethylvinyl ether-ethylene copolymer in aromatic hydrocarbon solvent.

15. The method of preparing articles which comprises forming a mixture of $\beta$-hydroxyethylvinyl ether-ethylene copolymer and a hydrocarbon diisocyanate in solid, particulate form, shaping such mixture, and heating the mixture to obtain a cured article.

16. A composition of solid particulate β-hydroxyethylvinyl ether-ethylene copolymer the particles of which are dusted with a hydrocarbon diisocyanate.

17. The method of preparing a high molecular weight copolymer which comprises copolymerizing β-hydroxyethylvinyl ether and ethylene at temperatures from 100° to 200° C. and pressures of about 15,000 to 50,000 p.s.i. in the presence of a free-radical initiating ethylene polymerization catalyst, the monomers being provided in amounts such that there are 2 to 10 molar parts of β-hydroxyethylvinyl ether for 100 molar parts ethylene.

References Cited in the file of this patent

UNITED STATES PATENTS

| | | |
|---|---|---|
| 2,467,234 | Sargent et al. | Apr. 12, 1949 |
| 2,669,754 | Chadbourne | Feb. 23, 1954 |
| 2,691,646 | Young et al. | Oct. 12, 1954 |
| 2,768,154 | Unruh et al. | Oct. 23, 1956 |
| 2,828,220 | McWherter et al. | Mar. 25, 1958 |

FOREIGN PATENTS

| | | |
|---|---|---|
| 486,097 | Canada | Aug. 26, 1952 |

UNITED STATES PATENT OFFICE
CERTIFICATE OF CORRECTION

Patent No. 3,025,267                       March 13, 1962

John D. Calfee

It is hereby certified that error appears in the above numbered patent requiring correction and that the said Letters Patent should read as corrected below.

Column 2, line 1, strike out "ethylene. The interpolymerization of the present inven-" and insert the same after "of" in line 1, column 3.

Signed and sealed this 3rd day of July 1962.

(SEAL)
Attest:

ERNEST W. SWIDER
Attesting Officer

DAVID L. LADD
Commissioner of Patents